Oct. 15, 1968
W. O. WHISNER
3,405,563
VARIABLE STROKE MECHANISM
Filed Oct. 24, 1966
2 Sheets-Sheet 1
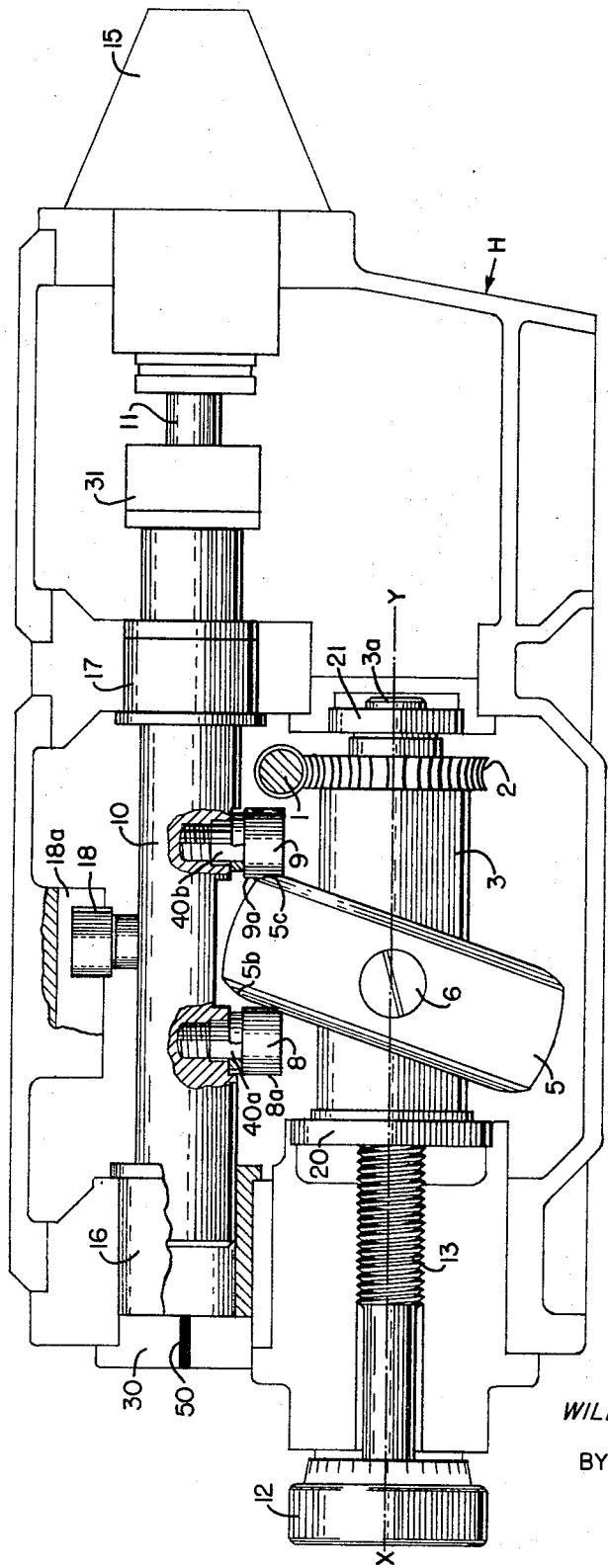
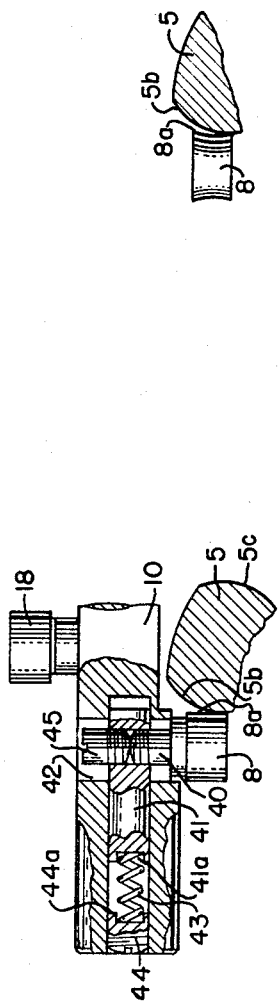
INVENTOR
WILLIAM O. WHISNER
BY 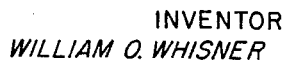
AGENT

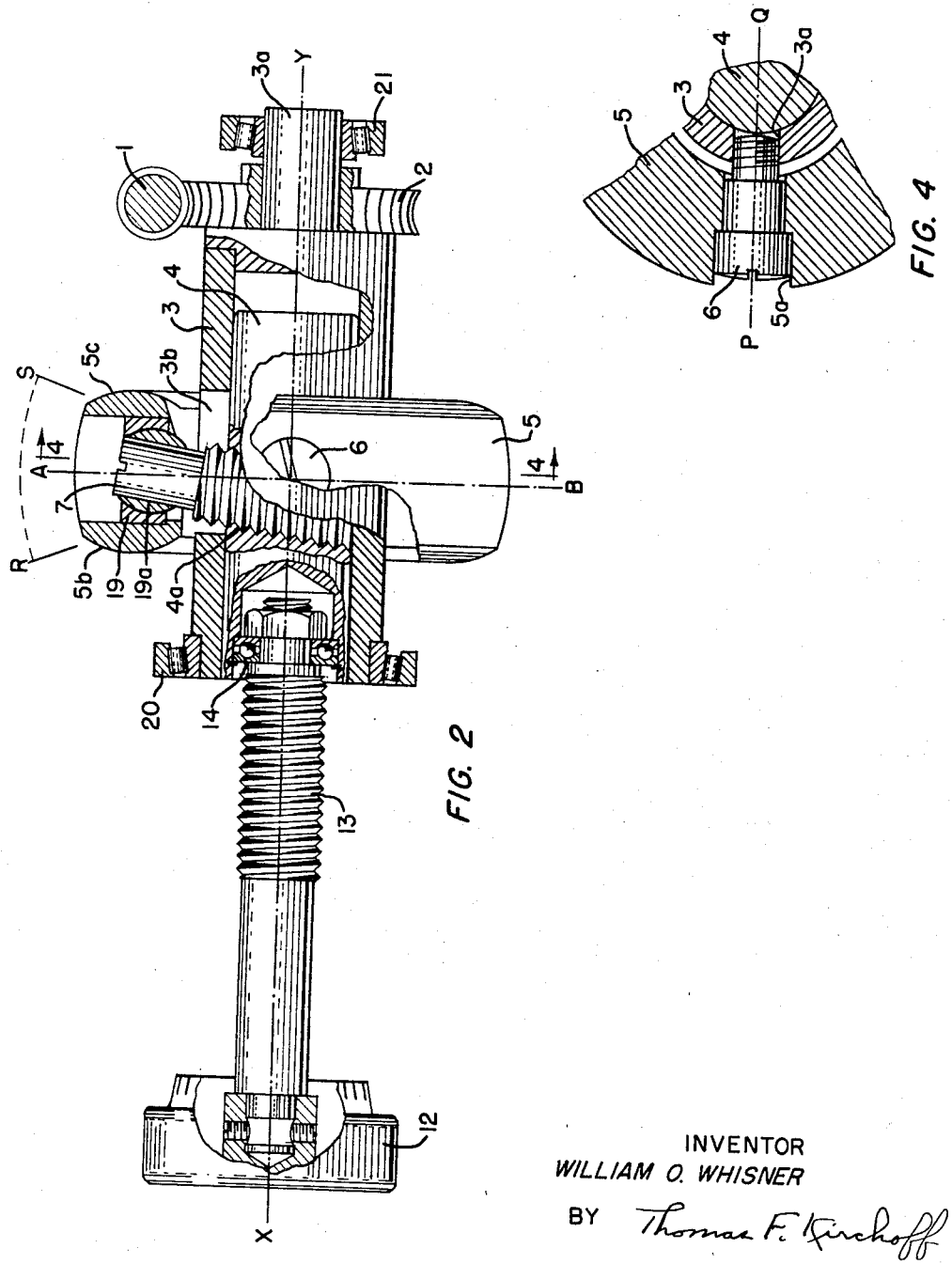

United States Patent Office 3,405,563
Patented Oct. 15, 1968

3,405,563
VARIABLE STROKE MECHANISM
William O. Whisner, Fairless Hills, Pa., assignor to William Hagen Co. Inc., Palmyra, N.J., a corporation of Pennsylvania
Filed Oct. 24, 1966, Ser. No. 588,962
11 Claims. (Cl. 74—56)

ABSTRACT OF THE DISCLOSURE

The present invention is concerned with an improved stroke adjustment device as such device relates to reciprocating pumps of the controlled volume type, and more particularly to an improved stroke adjustment device capable of providing an essentially linear flow rate.

---

Reciprocating pumps heretofore available have uniformly been based on non-linear fluid flow principles and have frequently suffered from the disadvantage of being burdened with intricate but essential mechanical components such as for example cross-head members and connecting rods which show poor wearability and durability in actual service.

The primary object of the present invention is the provision of a durable, variable stroke reciprocating pump having an improved construction.

A further object of the present invention is the provision of a pump which provides an essentially linear flow rate at all times on the discharge stroke.

Yet another object of the present invention is the provision of a drive and stroke adjusting mechanism as an integral assembly inherent in the pump construction.

It is another object of this invention to eliminate the heretofore essential cross-head member and associated connecting linkages.

A further object of the present invention is the provision of a means whereby any change from mid-position produces an oscillating motion equally distant on either side of its mid-position.

Further objects and advantages of this invention will become apparent from a consideration of the detailed description which follows, particularly with reference to the accompanying drawings wherein:

FIG. 1 is a sectional elevation of a reciprocating pump embodying the variable stroke mechanism of the present invention.

FIG. 2 is a sectional elevation of the wheel assembly in position zero.

FIG. 3 is a sectional elevation of a preferred modification of the guide bearing assembly of this invention.

FIG. 4 is a sectional view along line 4—4 of FIG. 2.

FIG. 5 is a plan view of one embodiment of the guide bearing-wheel assembly of this invention.

Referring now to FIG. 1, the invention is illustrated by a housing assembly H wherein there is a worm shaft 1 connected to a suitable power source. Communicating with worm shaft 1 is a worm gear 2 securedly fastened to hub 3a of a cylindrical drive sleeve 3. Positioned within drive sleeve 3, but freely movable and rotatable therein, is a positioning rod 4. Rotation of sleeve 3, rod 4 and wheel 5 is facilitated by roller bearing assemblies 20 and 21. Drive wheel or cam 5 is positioned around drive sleeve 3 so as to circumscribe the latter, and is secured thereto by a pair of pivot pins 6.

Each side of drive wheel 5 is journaled between a plurality of guide bearings 8 and 9 so as to ride freely therebetween.

The surfaces of guide bearings 8 and 9 are secured on shafts 40a and 40b which in turn are positioned on plunger drive 10. Plunger drive 10 is operationally responsive to the rotation of wheel 5 as hereinafter explained. Said plunger drive 10 is movable between cap 30 and valve assembly 15, and communicates at one end thereof with plunger or piston 11 which is coupled to plunger drive 10 through coupling member 31. No attempt is made herein to illustrate the inlet and outlet check valves of valve assembly 15 as these form no part of the present invention and may conform to any assembly presently known.

Plunger drive 10 is journaled through sleeve bearings 16 and 17, and is fitted with an anti-rotation bearing 18 which is positioned in slot 18a to provide uniform contact of wheel surfaces 5b and 5c with guide bearing surfaces 8a and 9a. Vent 50 is provided in cap 30.

Positioning pin 7 is threaded at one end thereof and positioned through slot 3b of drive sleeve 3 into a tapped recess 4a in positioning rod 4.

Positioning rod 4 is connected to positioning screw 13 by thrust bearing 14 which latter screw is fitted at the opposite end thereof with a hand wheel 12. Rotation of hand wheel 12 causes screw 13 to impart a horizontal motion to rod 4 thereby causing pin 7 also to move in the same horizontal direction as rod 4. It is to be understood that the illustrated hand wheel is but one method of providing remote control in the present structure, and that any desired and suitable manner of manipulating the hand wheel may be employed.

In operation of the mechanism of the present invention power is communicated from worm shaft 1 thus imparting a rotary motion to worm gear 2 and to drive sleeve 3 which is securely fastened through the hub 3a thereof to worm gear 2.

The rotary motion of drive sleeve 3, facilitated by roller bearings 20 and 21, is communicated to wheel 5 through pivot pins 6 which pins are positioned, as illustrated in FIG. 4 through opening 5a in wheel 5 and threadedly engaged in drive sleeve 3 through opening 3c. The head end of pivot pins 6 are recessed in opening 5a so as not to interfere with the internal operation of the pump mechanism. Similarly, the opposite ends of pins 6 are positioned such that they do not protrude beyond the inner surface of drive sleeve 3 so as not to interfere with operational movement of positioning rod 4. The rotary motion thus communicated to wheel 5 causes the latter to revolve about axis X–Y, as shown in FIG. 1.

Reference is made to FIG. 2 wherein wheel 5 is in a position substantially at right angles to axis X–Y. This is position zero wherein no oscillating motion is imparted to plunger 11 upon rotation of wheel 5, thereby resulting in no reciprocating action of plunger 11.

Adjustment by turning of hand wheel 12 causes horizontal movement of pin 7 through the action on screw 13 and rod 4, which in turn causes wheel 5 to pivot on axis P–Q as shown in FIG. 4. Rotary motion imparted through pivot pins 6 simultaneously causes wheel 5 to circumscribe an arc defined by R–S as shown in FIG. 2. This motion imparts an off-center or eccentric moment of revolution to wheel 5 about axis A–B as is illustrated in FIG. 2 whereby the bearing surfaces 5b and 5c of wheel 5 are urged against bearing surfaces 8a and 9a, respectively of guide bearings 8 and 9, thereby causing horizontal reciprocating displacement of plunger drive 10 and also of plunger 11.

It will be observed that rotation of hand wheel 12 results in a change in positive displacement of plunger 11 through the action of positioning screw 13, positioning rod 4, pin 7 and eccentric rotation of wheel 5. FIG. 1 represents the position of wheel 5 at substantially its maximum inclination on drive sleeve 3 and about axis X–Y.

A preferred embodiment of the present invention, as shown in FIG. 2, comprises mounting pin 7 at an offset angle through slot 3b of drive sleeve 3 and into the tapped recess 4a provided therefore in rod 4. This particular embodiment permits greater contact area between the surfaces of outer-bearing race 19 and inner-bearing race 19a, particularly as wheel 5 traces a revolution along arc R–S of greatest inclination.

It is also within the scope of this invention to provide for concave surfaces 5b on wheel 5 such as is shown in FIG. 5. Such concave surfaces may then be complimentary with convex surfaces of guide bearings 8a such as is shown in FIG. 5.

In the modification of FIG. 3 shaft 40, supporting guide bearing 8, is positioned within spring guide 41, so as to permit horizontal displacement within slot 42 of plunger drive 10. Spring 43 is positioned in recess 44a of spring button 44. Spring button 44 is adjustable to vary spring tension thereby causing guide bearing 8 to maintain contact with wheel 5 through all angular settings and revolutions of wheel 5 and also to compensate for operational wear on surfaces 5b and 5c of wheel 5.

Bearing shaft 40 may additionally be supported in spring guide 41 by a supporting screw 45 as shown in FIG. 3.

With the above explanation of the principles and features of this invention it will become apparent that numerous variations will be possible entirely within the spirit and scope of the appended claims.

What is claimed as the invention is:

1. A variable stroke mechanism comprising in combination a drive shaft, a rotatably driven sleeve connected to said shaft, a wheel circumscribed about said sleeve, guide bearings for said wheel, said guide bearings being disposed within a plunger, a positioning rod rotatably mounted within said sleeve, a positioning pin interconnecting said rod with said wheel, and means for imparting horizontal movement to said rod whereby oscillating motion is imparted to the rotation of said wheel along the longitudinal axis thereof.

2. A mechanism according to claim 1 wherein said wheel is connected to said sleeve by a plurality of pivot pins.

3. A mechanism according to claim 2 wherein two oppositely spaced pins connect said wheel to said sleeve.

4. A variable stroke mechanism comprising in combination a drive shaft, a driving gear supported on said shaft and driven thereby, a driven gear meshing with said driving gear and connected to a sleeve, a wheel circumscribed about said sleeve, guide bearings for said wheel, said guide bearings being disposed within a plunger, a positioning rod rotatably supported within said sleeve, a positioning pin interconnecting said rod with said wheel and means for imparting horizontal movement to said rod whereby oscillating motion is imparted to the rotation of said wheel along its longitudinal axis.

5. A mechanism according to claim 4 wherein said wheel is connected to said sleeve by a pair of oppositely spaced pivot pins journaled through said wheel.

6. A mechanism according to claim 4 wherein said positioning pin is journaled at an offset angle through said sleeve into said wheel.

7. A mechanism according to claim 4 wherein the bearing surface of one side of said wheel is concave and the mating bearing surface of at least one of said guide bearings is convex.

8. A mechanism according to claim 4 wherein at least one of said guide bearings is mounted on a moveable shaft.

9. A mechanism according to claim 8 wherein said moveable shaft is spring loaded.

10. A mechanism according to claim 4 wherein said plunger is stabilized in one plane by a non-rotational plunger guide.

11. A mechanism according to claim 10 wherein said plunger guide is stabilized in a fixed position by at least one anti-rotational bearing.

References Cited

UNITED STATES PATENTS

| | | | |
|---|---|---|---|
| 1,012,851 | 12/1911 | Hodgkinson | 74—56 |
| 1,804,440 | 5/1931 | Sherman | 74—56 |
| 2,328,542 | 9/1943 | Bates | 74—56 |

FRED C. MATTERN, Jr., *Primary Examiner.*

W. S. RATLIFF, *Assistant Examiner.*